United States Patent [19]

Ito et al.

[11] 4,020,442
[45] Apr. 26, 1977

[54] COMPOSITE-TYPE HEAT-SYSTEM FIRE SENSING DEVICE

[75] Inventors: Hiroshi Ito; Tadashi Sugiyama; Yoshinori Kaminaka; Yuichiro Yamamoto; Takeshi Tanigawa; Shunichi Shoji; Yoshifusa Saito, all of Tokyo, Japan

[73] Assignee: Hochiki Corporation, Tokyo, Japan

[22] Filed: Mar. 4, 1975

[21] Appl. No.: 555,210

[30] Foreign Application Priority Data

| Mar. 8, 1974 | Japan | 49-27613 |
| Mar. 12, 1974 | Japan | 49-28393 |
| Mar. 27, 1974 | Japan | 49-35571 |
| May 17, 1974 | Japan | 49-55454 |
| May 22, 1974 | Japan | 49-58364 |

[52] U.S. Cl. .................. 337/299; 337/3; 337/396; 337/35
[51] Int. Cl.² .................. H01H 37/02
[58] Field of Search ............ 337/3, 2, 1, 396, 88, 337/117, 320, 328, 299, 35; 200/83 P, 83 R, 83 W

[56] References Cited
UNITED STATES PATENTS

| 1,172,880 | 2/1916 | Denio | 337/396 |
| 2,066,700 | 1/1937 | Slough | 337/3 |
| 2,413,140 | 12/1946 | Griffith | 337/299 |
| 2,420,775 | 5/1947 | Griffith | 337/299 |
| 3,749,865 | 7/1973 | Kalt et al. | 200/83 R |

FOREIGN PATENTS OR APPLICATIONS

599,228  3/1948  United Kingdom ............ 337/396

Primary Examiner—Harold Broome
Attorney, Agent, or Firm—Frank J. Jordan

[57] ABSTRACT

Disclosed herein is an improved composite-type heat-system fire sensing device consisting essentially of a differential sensing element and constant-temperature sensing element, capable respectively of actuating a pair of electric contacts. These two type of sensing elements used in customary devices are difficult to assemble and to adjust. There are also serious problems for production and wider utilization of the sensing device. Further, the elements lack practical utilizability as well as reliability. The sensing device of this invention overcomes the abovementioned problems of the customary devices by effecting sensitivity matching of different operation characteristics of the two sensing elements, and makes it possible to optionally and freely adjust the sensitivity of the sensing device as required in accordance with the conditions of the place of installation of the sensing device so as to ensure a higher reliability and wider application of the sensing device.

8 Claims, 17 Drawing Figures

COMPOSITE-TYPE HEAT-SYSTEM FIRE SENSING DEVICE

DETAILED DESCRIPTION OF THE INVENTION

This invention relates to improvements in a composite-type heat-system fire sensing device consisting essentially of a differential sensing element and a constant-temperature sensing element. More particularly, the present invention relates to a construction of the fire sensing device of the abovedescribed type in which the operation of the sensing device on the basis of different functional characteristics of the two different sensing elements is permitted to take place rapidly in response to a thermal change caused in the sensing range of the device, and affords a method for matching of the different functional characteristics of the two sensing elements, said sensitivity matching being essentially required to eliminate difficulties with conventional sensing devices in the production of the devices as in the well as easy adjustment of the same as desired.

Differential sensing element generally utilize a ratio of change of a the state of a certain substance, and function in a change of condition which exceeds a statistically predetermined change ratio. As the sensing substance for this purpose, air, a specific gas or various liquid has been used conventionally. The abovementioned change ratio is maintained at a predetermined level for the sensing substance to effect its sensing function specifically so that the sensing substance does not cause a change of the state to result in an erroneous fire alarm due to various reasons other than a true fire.

A total quantity of the state change of the substance may likewise be used instead of using the change ratio of the substance. In this instance, too, a fire alarm may oftentimes accidentally be caused by various reasons other than the true fire when, for example, a room is heated up to a temperature higher than the ordinary temperature whereby the change of the state of the sensing substance proceeds to a considerable extent.

Meanwhile the change ratio of the state change took place in the sensing substance arising from reasons other than the fire is substantially smaller than the change ratio of the substance due to the fire itself. In order to produce a differential sensing element, therefore, it is of utmost importance that setting of the the change ratio to cause the sensing function of the element can be made freely, easily and accurately.

As a standard for setting the change ratio, a value corresponding to 10° C./min. (a change ratio on the basis of elevation of temperature of 10° C. per minute) is used in general.

On the other hand, a low-melting solder in the form of a fuse, or a bimetal is frequently used as the constant-temperature sensing element. The sensing characteristic of this sensing element lies in the fact that although the sensing element melts or deforms at a predetermined temperature, a long period of time elapses before melting or deformation occurs. That is to say, even when an overall temperature in the sensing range of the sensing device (for example, a room) exceeds a predetermined temperature, the constant-temperature sensing element does not function before a considerable period of time has elapsed. It is worth noting further that when a bimetal is given a rust-resisting or anticorrosive coating layer, the coating layer degrades the heat conduction of the bimetal, and promotes a time lag in the functioning of the sensing element. So to compensate for the time lag, or to accelerate the functioning of the sensing element, various considerations should essentially be paid in the construction of the sensing device.

As a typical conventional composite-type heatsystem fire sensing devices, U.S. Pat. No. 2,724,823 discloses an embodiment in which a differential sensing element using a diaphragm is combined with a constant-temperature sensing element consisting of a low-melting solder, is retained in a predetermined posture by a spring storing the resiliency. The embodiment disclosed in this patent specification has the disadvantage that the sensing device cannot be used repeatedly because of the low-melting solder, and in addition, performance testing can not be carried out for the device. This is an important failing of such a device. Further the use of the spring as a component of the constant-temperature sensing element results in a remarkable increase in the heat mass, and increases the time lag between the start of the fire and the generation of the fire alarm output, said time lag having been observed in constant-temperature sensing elements of the conventional type.

For a better understanding of the present invention as well as other objects and further features thereof, reference is had to the following detailed description of the invention to be read in connection with the accompanying drawings which are to be considered in all respects only as illustrative and not restrictive in any manner whatsoever. Accordingly variations and modifications can naturally be effected by one of ordinary skill in the art within the scope and spirit of the present invention on the basis of the principle of the sensitivity matching of the invention.

In the accompanying drawings.

The objects of the present invention, the construction of the composite-type heat-system fire sensing device to accomplish these objects and improvements attained in this invention will be understood from the following description of the invention.

A fire at the initial stage causes convection within the sensing range of the sensing device, and the convection in turn comes into contact with the sensing device. In order to prevent erroneous operation of the sensing device effectively, it is preferred to install the sensing device on the ceiling away from the ordinary path of movement of people. As the thermal capacity of a building such as the ceiling is larger than that of the sensing range of the sensing device, a relatively higher temperature section inside said heat convection takes place at a portion relatively lower than the ceiling to which the sensing device is installed. In order to utilize this natural phenomenon confirmed by numerous experiments for the improvement of the quick response of the sensitivity and functioning of the sensing device, the sensing device of this invention has a bowl-shaped heat-receiving section possessed of a metallic side wall and a bottom wall. Namely so as to make the most of the heat convection as well as the heat-receiving effect of the metallic side wall which contacts with the convection in a manner to interrupt the same, the bottom wall is arranged to receive the heat substantially from directly below the sensing device. The bowl-shaped space of the heat-receiving section thus formed is utilized as an occupying space of a state-changeable substance which is indispensable to the differential sensing element, thereby avoiding an increase in heat mass. Further, to form the differential sensing element, a diaphragm made of an extremely thin metallic plate is supported in a space in a predetermined distance from the bottom wall of the bowl-shaped heat-receiving section so as to complete the occupying space or chamber for the state-changeable substance.

As a result of the direct use of the bowl-shaped heat-receiving section determined from the standpoint of the heat-receiving effect of collecting a high temperature section conveyed by the convection as the differential sensing element, the need for extra materials and the heat mass resulting therefrom are minimized in the present invention, said extra materials normally causing an increase of the heat mass as much.

The feature of the present sensing device in the excellent heat-receiving effect of the abovementioned bowl-shaped heat-receiving section is utilized in order to accelerate the functioning of the constant-temperature sensing element that is slower in its functioning in comparison with the differential sensing element with respect to the interval from the beginning of the fire till the start of the sensing operation. In other words, since the constant-temperature sensing element is provided at the bottom wall of the heat-receiving section, a relatively low heat of the fire at the initial stage conveyed substantially by the convection is imparted effectively to the constant-temperature sensing element to thereby approach effectively to a saturation temperature of said element. In comparison with conventional devices having thermal transfer routes including an ineffective route, the thermal transfer efficiency to the constant-sensing element in the present device is by far superior.

The differential sensing element whose construction is determined from the abovementioned standpoint utilizes air as the state changeable substance for the purpose of facilitating the setting of the change ratio of the operation. As an erroneous operation is apt to occur when the total change quantity of the substance is used. method of sealing the state changeable substance in a sealed space may be avoided in principle. This method, however, is not advisable because it is not free from the defect that a specific gas or liquid passing in and out from the bowl-shaped heat-receiving section tends to be dispersed or cause frequent qualitative change.

In case air is employed, care should specifically be taken so as not to allow the gathering of condensate in the bowl-shaped heat-receiving section. When the state changeable substance varies its state with a smaller change ratio than the change ratio of operation to be set, this small change oftentimes increases the internal pressure of the differential sensing element. Accordingly, means should also be provided to permit the internal pressure to leak or vent to the atmosphere.

Of the constant-temperature sensing element, the low-melting solder used to restrain the shape of the spring in the bent state to store the resilient restoration force has an increased heat mass as a result of the use of the spring in addition to the solder per se, resulting in various problems to be described. First, sensing operation can not be accelerated. Second, repeated usage is impossible to lessen the practicality of the same. Third, performance testing is not feasible so that the performance of the sensing device is solely dependent on the production steps, and in consequence, accurate performance can hardly be secured.

In order to make the most of the heat-receiving effect of the bowl-shaped heat-receiving section having a specific feature in receiving the convention, the circular bimetal having a curvature is combined with the same in the present invention. It is indeed of utmost significance industrially that the combination of the circular bimetal with the bowl-shaped heat-receiving section provides the composite-type heat-system sensing device with an unexpectedly excellent construction in its principle.

In case a rectangular bimetal is adapted to the metallic bottom wall of the bowl-shaped heat-receiving section which is set forth as the basic construction of the present invention, heat conductive plane of the bottom wall and the rectangular bimetal can not be enlarged fundamentally so that the excellent heat-receiving effect of the bowl-shaped heat-receiving section can not be utilized to maximum.

Contrariwise the circular bimetal equipped with a curvature in the present invention can receive a larger heat quantity from its heat conductive plane as well as from the bottom wall. Namely the circular bimetal can enlarge its heat conductive plane by contacting its circumferential periphery to the metallic bottom wall whereas in the rectangular bimetal the heat conductive plane is limited only to the fixed edge of a small portion connecting to the bottom wall, as one edge of the rectangular bimetal must be afloat in the spacing.

Further, the heat conductive effect is determined substantially by the cross sectional area of the bimetal. The principal heat conductive plane lies in only a small sectional area at the one fixed end in the rectangular bimetal while the heat conductive plane can drastically be increased in the circular bimetal. This effect constitutes the practical basis for changing variously the correlation between the circular bimetal and the bottom wall over a wide range.

In the rectangular bimetal having a fixed end and a free end which causes deformation and displacement, the deformation point lies in the free end, and the deformation/displacement characteristic resulting from the heat reception of this free end is linear. In the circular bimetal equipped with a curvature, on the other hand, the deformation point lies in the reversible curvature whose reversible displacement is not a linear displacement, but a jumping displacement.

Difference in the heat-receiving effect of these two types of the bimetals is also one of the important facts in practice. As will later be described, a required curvature of the circular bimetal can be enlarged to an extremely large extent so that the distance between the bimetal and the bottom wall can be made extremely small when adapting the circular bimetal to the bowl-shaped heat-receiving section. This in turn minimizes the influence of heat conduction arising from air present in between the said distance.

In the rectangular bimetal, on the other hand, a thicker thickness and a larger size are required in order to exhibit a required displacing force whereby the aforementioned heat receiving effect is further deteriorated. This renders a serious problem for enhancing the quickness of operation of the constant-temperature sensing element.

The circular bimetal per se used in the present invention has been put into practical use conventionally. However, the present invention contemplates to utilize the characteristic of the circular bimetal to a maximum extent so as to thereby solve the major problem imposed on the conventional composite-type heat-system fire sensing device which has a high sensitivity capacity inherently as a fire sensing device. Namely, the present invention provides a novel basic construction which ensures a higher productivity and reliability altogether.

Needless to say, fire sensing sensitivity must be regulated properly over a wide range depending upon the conditions at a position of installation of the device, as, for example, living room, safe-deposite room, office, boiler room, kitchen, various laboratories, factories, warehouse and so forth. The present invention provides a construction which satisfies these requirements with a few standard model by means of its accurate sensitivity matching. In this point, the sensing device of this invention distinguishes itself clearly over the conventional devices of the similar type.

Heretofore there has been known the conception wherein a circular bimetal is employed as a constant-temperature sensing element, and the reversible operation thereof is utilized for switching of an electric contact: To this date, however, there has been developed no construction of a composite-type heat-system sensing device which utilizes the sensitivity matching between a constant-temperature sensing element and a differential sensing element.

The sensitivity displacement characteristic of the differential sensing element is linear, and the product has a difference in a gradient of the linear displacement characteristic. Since the displacement characteristic of a rectangular bimetal is linear, when the rectangular bimetal is combined with this differential sensing element, the sensitivity matching between the two members is determined at a cross point of the two linear displacement characteristic lines.

In order for the differential sensing element to cause switching of the electric contact in accordance with the interval determined by the fire sensing standard, the electric contact is first adapted to the differential sensing element which displaces with a minimum change ratio to start the sensing function at such a position where the slowest displacement takes place in a minimum linear manner within the predetermined interval. Next, a displacement point at a predetermined temperature on the linear displacement characteristic of the constant-temperature sensing element is placed so as to correspond to the position of the electric contact.

The sensitivity matching described above is by no means easy, and renders a major problem for improving the productivity. Further, if the position of the electric contact is changed so as to adjust at a later stage the sensitivity of the differential sensing element in match with a sensing range of installation of the sensing device, the sensing temperature of the constant-temperature sensing element is also changed simultaneously. In the re-adjustment of the sensing temperature of the rectangular bimetal to the original temperature, an installation angle of the bimetal must be adjusted minutely. As the angle adjustment calls for a strict and fine adjustment, this is almost impossible in practice.

Features of the sensitivity matching and the basic construction enabling the sensitivity adjustment in the present invention are described in the paragraphs to follow.

As noted above, the sensitivity displacement of the circular bimetal with a curvature jumps at its characteristic temperature. The maximum displacement point of the differential sensing element is placed onto this jump displacement range of the characteristic. The maximum sensing displacement point can be obtained by multiplying a minimum change ratio by the time interval (administrative standard) permitted prior to generation of the fire alarm at which said minimum change ratio the sensing device initiating the sensing operation in accordance with the Fire Alarm Standard stipulated administratively for safety. This minimum sensing displacement point varies with differential sensing elements produced practically on a commercial basis. That is to say, the differential sensing elements to operate under the same condition of the minimum change ratio exhibit a considerable difference with one another in the sensitivity characteristics, ranging from one having a smaller sensing displacement to another having a larger sensing displacement. This variation arises from a slight difference in a hardness of the diaphragm used and the like. The differential sensing element having a minimum sensitivity displacement characteristic supplies a maximum displacement point which is determined as the lower limit to safety the administrative standard. Differential sensing elements having a larger sensitivity displacement characteristic than the above can all be used, because the interval between the sensing and the fire alarm output is shorter than the administrative standard time in these elements.

The maximum displacement point as the lower limit restrains in practice the zero standard of the differential sensing element prior to the sensing function up to an imaginary position of the electric contact to be adapted. As noted in the foregoing paragraphs, in the case of the rectangular bimetal which varies a displacement quantity linearly, it is extremely difficult from the industrial point of view to have the imaginary position of the electric contact correspond to a displacement point at a required temperature for the rectangular bimetal. This procedure is indeed far apart from practicality, and inhibits the improvement of productivity.

As the sensitivity displacement characteristic of the circular bimetal equipped with a curvature in the present invention jumps at a predetermined temperature required, the sensitivity matching is effected by brining the maximum displacement point, or, the distance between the absolutely required differential sensing element and the electric contact, into the range of this jump characteristic displacement range. In this manner, the sensing function of the differential sensing element can be combined with the constant-temperature sensing element without causing unstability of the sensing function of the latter.

This principle permits tolerance of a deviation of characteristic observed in the differential sensing elements as they are produced commercially, thereby decreasing the number of rejected products drastically. The principle also offers a basis for the sensitivity matching to satisfy a wide variety of conditions required for installation and application of the sensing device, i.e., sensitivity required for the sensing device in match with the location of installation. The present invention is directed to make the best of this principle for developing a novel sensing device which is applicable practically.

Our experiments have shown the following. When the circular bimetal is placed into a stream of gas which has a velocity of 1 m per second and an elevation of temperature at a rate of 1° C. per minute (corresponding to about one tenth of the abovementioned standard change ratio), the heat mass required to cause jump displacement within substantially zero second, is 0.2 second after the temperature in the vicinity of the sample reversible bimetal has reached a saturation temperature of the jump displacement.

On the basis of this slight mass, the sensitivity matching in the present invention now becomes a practical principle. The heat mass required for the practical application ranges from 0.1g up to 10g as the basis of various standard values. (In the case of a big sensing device, the upper limit may be increased in accordance with the sensitivity required.)

Excellent values for the jump characteristic displacement range can be derived from this extremely small heat mass of 0.2g as shown, for example, in the following Table. The data shown in the Table covers the following case; a circular bimetal having a mass of 0.2g is molded in a diameter of 14mm and a thickness of 0.15mm. Curvature of the circular bimetal is changed variously to determine the jump displacement range in each case.

| Curvature 1/R (R = mm) | Jump Characteristic Displacement Range (mm) |
| --- | --- |
| 1/70 | 0.4 mm |
| 1/60 | 0.45 mm |
| 1/50 | 0.55 mm |

In order to use the good jump characteristic displacement range effectively, thickness of the bimetal is preferably from 0.1 to 0.3mm, and 2 - 3 mm may be used as desired. Likewise the area of the bimetal is effectively from 5 - 20 mm in terms of the diameter, and 30 - 50 mm may also be used as desired.

With respect to various materials for use in the diaphragm, intensive studies have been made of the deviation of characteristic observed in differential sensing elements that account for about 90% of the total products produced by ordinary technique for production and control, and that are produced so as to be possessed of about 0.4mm of linear displacement characteristic in match with the abovementioned jump characteristic displacement range of 0.4mm. As a result, it has now been found that the deviation is about 0.1mm calculated as the difference between the upper and lower values of the maximum displacement point. If there is a distance of at least 0.2mm between the imaginary plane defined by the periphery of the circular bimetal with a curvature and the remotest point of the curvature thereof (the jump characteristic displacement range being about 0.4mm), therefore, a composite-type heat-system sensing device can be mass-produced with a yield of more than 90%.

The sensing device thus produced also makes it possible to make the sensitivity adjustment over a wide range in accordance with the sensing rage for the application of the sensing device. The abovementioned remote point can not be made large remarkably because of conditions calling for sharpness and quickness of the jump displacement. In ordinary conditions, this remote point is preferably from 0.1 to 5mm, but may be up to about 10mm at times.

Meanwhile the administrative standards enforced for the protection against fire stipulate a specific standard so as to distinguish a true fire from various thermal changes other than the true fire in view of the fact that the sensing device tends to operate erroneously due to heat sources except the fire when it is installed at positions exposed to or near heat sources such as kitchen, boiler room, various laboratories, factories and so forth. Namely the second regulation is set forth to lower the sensitivity of the sensing device.

In accordance with the principle of the sensitivity matching of the present invention, the sensitivity adjustment to conform to the second standard can be made easily and accurately by lowering the lower limit of the maximum displacement, that is to say, by enlarging the minimum distance between the standard zero point of the diaphragm as the differential sensing element and the opposed electric contact.

By this arrangement, sensing operation time of the sensing element can be extended longer than the original standard time with a change ratio larger than the preset change ratio stipulated originally in the sensing operation starting condition, whereby the composite-type heat-system sensing device can signal the fire alarm in a range where there is a heat source only when the true fire takes place actually.

In the above-described embodiment using the combination of the circular bimetal and the lower value of the maximum displacement of the differential sensing element, the sensitivity matching can be made by increasing the distance between the contact to about 60% in order to bring the sensitivity thereof into conformity with the second standard from the first standard. In this manner a similarly standardized sensing device as produced can be adjusted easily and accurately to conform to various administrative standards.

The administrative standards in Japan, for example, stipulate, as the first standard, that the sensing device should generate a fire alarm within 4.5 minutes after it has been expressed to a stream having a temperature elevation at a rate of 10° C. per minute, and as the second standard, that the device should generate the alarm within the same period after it has been expressed to the stream having a temperature elevation at a rate of 15° C. per minutes.

If the sensing device to meet with the first standard is placed in the condition set forth in the second standard, i.e., in the stream having a temperature elevation at a rate of 15° C. per minute, the time allowed for the device to generate the alarm is about 3 minutes.

An example of the sensitivity matching of this invention is now illustrated of the reversible bimetal having a mass of only 0.2g with respect to the jump characteristic displacement range of 0.5mm (curvature = 1/50) which is shown in the aforementioned Table. In the following Table, X in the column "Sensitivity Matching" indicates a distance from the standard position (0mm) of the differential sensing element to the maximum displacement point.

| Sensitivity Matching | Degree of Sensitivity | Time required before fire alarm | Contact gap | Ex. of sensing range |
|---|---|---|---|---|
| 1/3X | Ultra-high | 1 min. | 0.1mm | computer room, safe-deposit room |
| 2/3X | high | 1.5 min. | 0.2mm | basement, warehouse, library |
| X(maximum deformation point) | 1st standard | 2 min. | 0.3mm | living room theater |
| 4/3X | 2nd standard | 3 min. | 0.4mm | office warehouse |
| 5/3X | Ultra-low | 4.5 min. | 0.5mm | boiler room kitchen |

From the industrial point of view, it is undoubtedly one of the biggest advantages of the present invention that the sensitivity matching can be effected over a wide range for the composite-type heat-system fire sensing device of the present invention which can be produced on a mass-scale with a yield of more than 90%.

Figure 11:
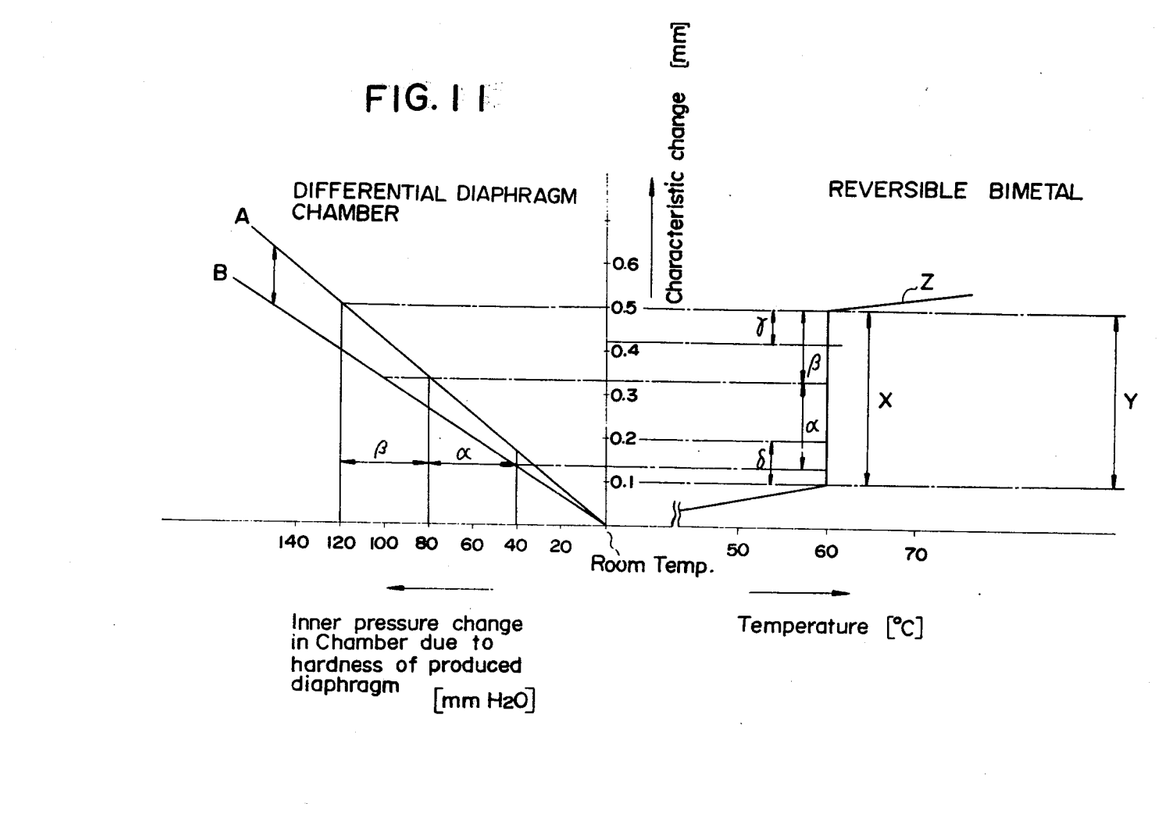
FIG. 11 is a chart showing a jump sensitivity displacement characteristic of the circular bimetal equipped with a curvature to support the sensitivity matching of the present invention.

The mode of effecting the sensitivity matching in the present invention is illustrated in FIG. 11. In the figure, Z stands for a jump characteristic of the reversible bimetal of the abovementioned embodiment whose jump range X is utilized as a gap Y for the electric contact determined by the standard products. The axis of ordinate represents respectively a displacement quantity of the reversible bimetal and of stretch of the diaphragm plotted on the left. In the axis of abscissa, the right direction indicates a temperature while the left direction indicates a pressure inside the diaphragm chamber which represents a deviation of characteristic of the diaphragm. Namely when the diaphragm chamber exhibits stretching at a same change ratio, difference in hardness of the diaphragm resulting from deviation as a product functions in the following manner; a harder diaphragm exhibits a smaller stretching and has a higher pressure inside the chamber, whereas softer diaphragm exhibits a larger stretching and has a relatively smaller inner pressure. Hence, the characteristic of the diaphragm can be expressed in terms of the internal pressure of the diaphragm chamber.

The diaphragms showing an internal pressure of 40 – 80 ($mmH_2O$) after a predetermined period of time under the aforementioned change ratio is most suited for the first standard, and is indicated by alpha. Those having the internal pressure of 80 – 120 ($mmH_2O$) are considerably harder, and are therefore suitable for the second standard which is indicated by beta. Two linear lines A and B indicate correlation between the upper and lower values of the aforementioned maximum displacement point (unit stretch quantity of the diaphragm X time set forth by the administrative standard), and the internal pressure.

Diaphragms having an internal pressure of 40 $mmH_2O$ or below has a larger stretching, and can be used for a high sensitivity or ultra-high sensitivity (delta) device. Likewise those having an internal pressure exceeding 120 $mmH_2O$ have a smaller stretching, and can be used for a ultra-low sensitivity (gamma) device.

By combining the sensing element with a bimetal having a small curvature (which has a larger jump characteristic displacement range) or one having a larger curvature, ultra-low sensitivity range (gamma) or ultra-high sensitivity range (delta) can easily be enlarged industrially. For this reasons, the composite-type sensing device can be massproduced with a yield of substantially 100%. The spacing Y between the moving electric contact to be fitted onto the diaphragm and the opposed electric contact to be loacted on the basis of the jump characteristic displacement range is generally larger in the case of a ultra-low sensitivity model and is smaller in a ultra-high sensitivity model, which, however, is determined in proportion to a period of time allowed for the sensing device to generate a alarm output.

Figure 12:
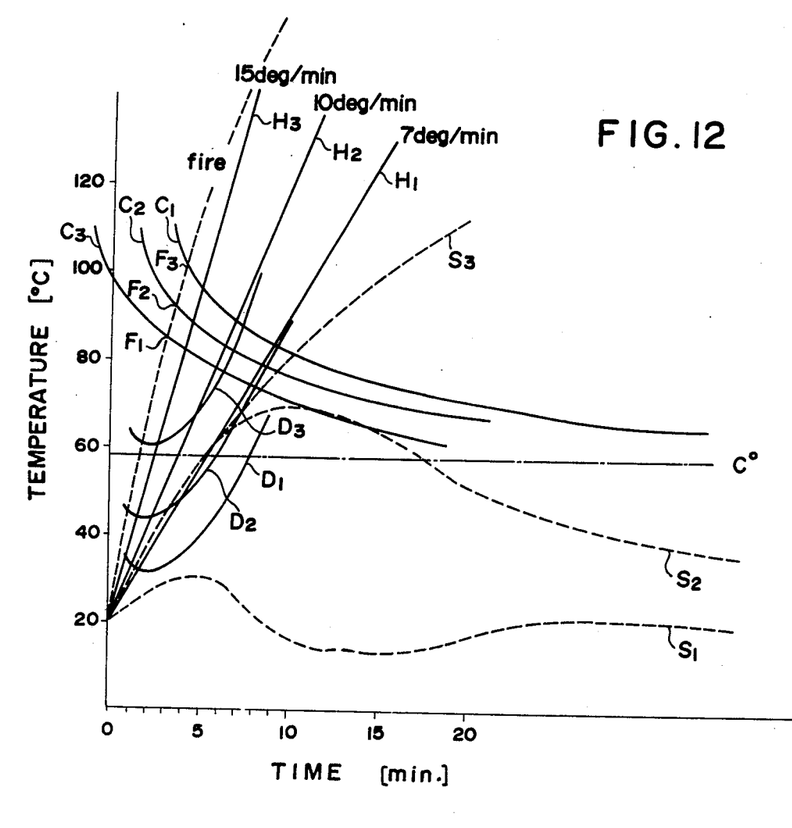
FIG. 12 is a chart showing a sensitivity change adjusted in accordance with the sensitivity matching of the present invention; and, FIG. 13 is a cross sectional view showing another embodiment of a composite-type heat-system fire sensing device of the present invention.

FIG. 12 is a diagram illustrating a rough correlation between the sensitivity matching and a sensing range to be watched by the sensing device.

Curve S1 represents a sensing range where a room temperature change is small such as, for example, office, computer room, safe-deposite room and so forth.

Curve S2 indicates an example of a room temperature change in a sensing range where heating is required or a heat source is somehow allowed present.

Curve S3 illustrates a sensing range where heat sources are frequently used such as in the kitchen, and abrupt temperature change may oftentimes occur strongly as shown in the diagram.

Three linear lines H1 – H3 represents statistically the abovementioned three sensing ranges which are distinguished from one to another by various temperature changes. The line H1 covers the case where the rate of temperature rise is less than 7° C. per minute; H2 for 10° C./min. or less, and H3 for 15° C./min. or less.

Sensitivity of the sensing device is adjusted by effecting the sensitivity matching so as to be most suited for a sensing range having these conditions.

In most cases fires exhibits a temperature rise of 15° C./min. or more, which is shown by fire in the figure. Group of curves D1 – D3 indicate the sensitivity characteristic of the differential sensing element when the sensitivity matching is effected to the element so as to correspond to the abovementioned curves S1 – S3 or the statistical linear lines H1 – H3. This sensitivity characteristic hardly changes in a same sensing element. That is to say, as can be understood from the relation with the time plotted on the axis of abscissa, the sensing device does not generate an alarm output when a temperature in the sensing range gradually elevates.

For instance, the differential sensing element of D3 whose sensitivity is lowered does not function to a temperature change inherent to the sensing range of the line H1 or the curves S1 – S3.

In this case, the sensing device functions in the range of the lines H2 and H3, and also fire.

The curves C1 – C3 represent a sensitivity characteristic of the constant-temperature sensing element. When a sensing range has a relatively high temperature under normal condition, the curve deviates to the left, for instance, to C3. When a sensing range has a relatively low temperature under normal condition, on the other hand, the curve deviates to the right, for instance to C1. In the figure, a temperature level (° C) of about 60° C. is shown as a sensing temperature of the constant-temperature sensing element. When the spacing between this level (° C) and each of the curves C1 – C3 is large, the time lag is large for the constant-temperature sensing element to reach its saturation temperature after it has started receiving heat.

Even if the same constant-temperature sensing element is pre-set so as to generate an alarm output at 60° C., it starts functioning about 5 minutes after it has received heat of 100° C. in the curve C1 where a normal temperature of the sensing range is low, and about 3 minutes after it has received heat of about 85° C. in the curve C3 where a normal temperature thereof is high. These relations are represented by the cross points F1 – F3 of the fire curve with the curves C1 – C3.

Provided that the fire-causing souce is generating a heat of, for example, 60° C. at the initial stage, the time required for the constant-temperature sensing element to reach its own saturation temperature for operation may be considered substantially the same with the time required for the entire space in the sensing area to reach 60° C..

Unless the sensitivity of the differential sensing element is determined in match with the normal temperature in the sensing area and also with a pattern of a possible temperature change, the sensing device not only fails to distinguish a true fire from other heat changes, but also causes erroneous fire alarm frequently. Further even if the true fire occurs, the device requires an undesirably longer period of time before it generates an alarm output, and fails to perform its fire-detecting function.

Figure 1:
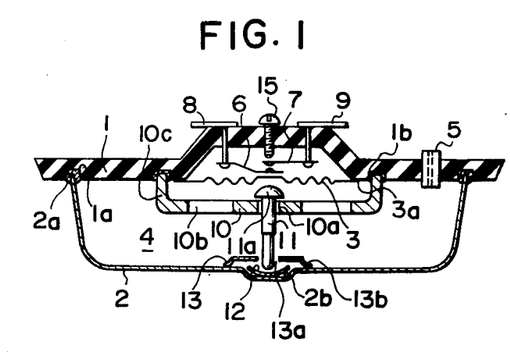
FIG. 1 is a cross sectional view of an embodiment of this invention.

FIG. 1 shows a fundamental form of the sensing device according to the present invention, in which 1 is an insulative base plate made of a synthetic resin, etc., and 2 is a heat-receiving plate made in a bowl form by pressing a metallic thin plate. The side edge 2a of the heat-receiving plate is fitted to a groove 1a of the base plate 1 and adhered firmly by an adhesive agent to keep air-tightness. The reference number 3 is a diaphragm made of a metallic thin plate such as of beryllium or phosphor bronze and its periphery 3a is firmly attached to the base plate 1 using an adhesive agent. These members 1, 2 and 3 constitute an air chamber 4. The reference number 5 represents a vent or leak hole punched through the base plate 1, and permits leakage of air contained in the air chamber 4. At the back of the diaphragm 3 are provided a pair of electric contacts 6 and 7, which are connected to contact pieces 8 and 9. The contact pieces 8 and 9 have rigidity and are inserted in the socket which is not shown, so that the sensing device is mounted to the ceiling, etc. The number 15 stands for an adjustment screw for setting the operation point.

Figure 2A:
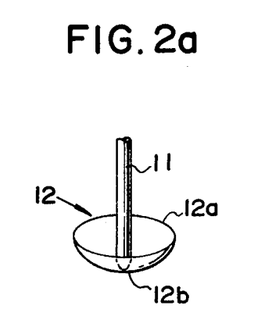
FIG. 2a is a perspective view showing in part the relation between a circular bimetal equipped with a curvature and an operation or push rod.
Figure 2B:
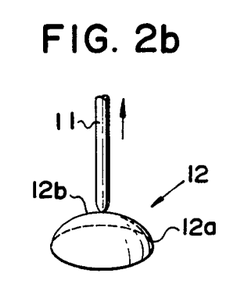
FIG. 2b is a perspective view showing the condition of the circular bimetal with a curvature together with the operation rod when the bimetal has effected jumping of a sensitivity displacement.

In front of the diaphragm 3 is provided a pin or plush rod guide 10 which is of a disc shape with its periphery being offset. At the center of pin guide 10 are provided a hole 10a in which will be loosely inserted a push-rod 11, and a plurality of ventilation holes 10b provided around the hole 10a. The erected or offset peripheral part 10c is fitted to the annular groove 1b provided on the base plate 1 and attached firmly by an adhesive agent. At the center of the heat-receiving plate 2 is press-formed a recess 2b to contain a reversible bimetal 12. The reversible bimetal 12 assumes a spherical shape which is cut away as shown in FIG. 2a, and initially takes such a shape that the periphery 12a is higher than the apex 12b; then, as the temperature rises to a setpoint temperature, the bimetal reverses itself to push up the push-up pin 11 as shown in FIG. 2b. Above the reversible bimetal 12 is provided a bimetal covering 13 which covers the upper part of the reversible bimetal 12 to prevent fly up of the bimetal. The covering 13 has a hole 13a at its center through which is penetrating the top of the push-up pin 11 that comes into contact with the apex 12b of the reversible bimetal. The covering 13 may be attached to the heat-receiving plate 2 in an appropriate maner such by adhering the periphery 13b to the heat-receiving plate. The bimetal 12 and the push-up pin 11 constitute a constant-temperature operation element.

Operation of the alarm is based on the following principle; if now the ambient temperature is raised quickly, the air in the air chamber 4 undergoes expansion, and the air which is not permitted to be leaked readily enough through the leak hole 5 pushes the diaphragm 3. The diaphragm 3 then pushes the contact 6 which comes into contact with the contact 7. Thus, the contact pieces 8 and 9 establish an electric circuit to energize the alarm circuit which is connected to these contact pieces. If the ambient temperature rises so gradually, the air expanded in the air chamber 4 flows out through the leak hole 5 and does not much press the diaphragm 3. Hence the contacts 6 and 7 are not closed. But if a pre-determined temperature is reached, the bimetal 12 is reversed and pushes up the pin 11. The pin 11 at its head 11a pushes the diaphragm 3 and causes the contacts 6 and 7 to be closed via the diaphragm. In this way, the sensing device of the present invention reliably produces an alarm if a predetermined temperature is reached, even if the temperature rise is so slow.

The reversible bimetal 12 used in the sensing device reliably undergoes reversal at a predetermined temperature to close the contacts 6 and 7. Unlike a rectangular bimetal piece, the bimetal employed in the sensing device of the present invention does not follow a proportional linear displacement movement; therefore, no adjustment screw is needed such as of screw 15. Further, despite the contacts 6 and 7 which work for both system, i.e., differential movement system and constant-temperature system the screw 15 may simply be adjusted with regard to the contact operation of the differential movement system, making it very easy to adjust the operation point.

Moreover, a recess 2b is press-formed on the heat-receiving plate 2 to contain a reversible bimetal 12. Therefore, no particular means is required to attach the reversible bimetal to a determined position; the recess 2b may simply be formed to contain the bimetal, thereby permitting the reversible bimetal to receive the ambient temperatures. The amount of displacement recoverable from the reversible bimetal is not so large that it is necessary to have the tip of push-up pin 11 contacted to the maximum displacement point of the reversible bimetal, i.e., to the apex 12b. To do this, it is necessary to accurately determine the position of placing the reversible bimetal; the recess 2b formed on the heat-receiving plate 2 quite easily enables to determine the precise position of the reversible bimetal.

Further, according to the present invention, the reversible bimetal and the push-up pin are provided in the air chamber, in other words, the differential sensing part and the constant-temperature sensing part are arrayed one above another saving space, thereby providing the contacts 6 and 7 for both of them commonly. Therefore, as compared to the earlier compensation type sensing devices in which the differential sensing part and the constant-temperature sensing part are arrayed on both sides of the contacts, the sensing device of the present invention can be constructed in a very thin shape, providing quick sensing performance.

Figure 3:
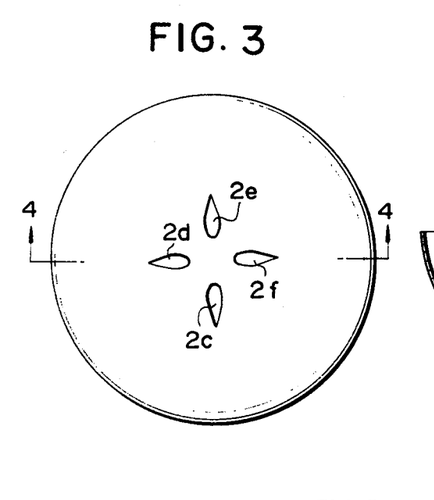
FIG. 3 is a bottom plan view showing the lower surface of the bottom wall of a bowl-shaped heat-receiving section as the basic construction of the present invention.
Figure 4:
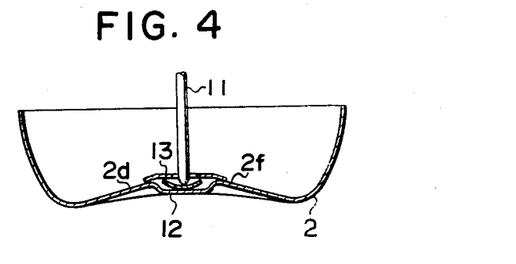
FIG. 4 is a cross sectional view of another embodiment of the bowl-shaped heat-receiving section along the line 4 — 4 in FIG. 3.

The recess 2b to contain the reversible bimetal shown in FIG. 1 has a circular dish shape if viewed from the side. But the recess may be of any simple means if it can hold the bimetal at a predetermined position, and, therefore, may be of a shape shown in FIG. 3. FIG. 3 shows a heat-receiving plate 2 viewed from the bottom, and FIG. 4 shows the cross-sectional view along the line 4—4. As shown in these diagrams, a plurality of petal-like projections 2c-2f (four projections in this example) may be press-formed along the periphery to extended inwards, so that the reversible bimetal is contained in the space surrounded by these projections. Conduction of heat to the circular bimetal can be assured sufficiently.

Figure 5:
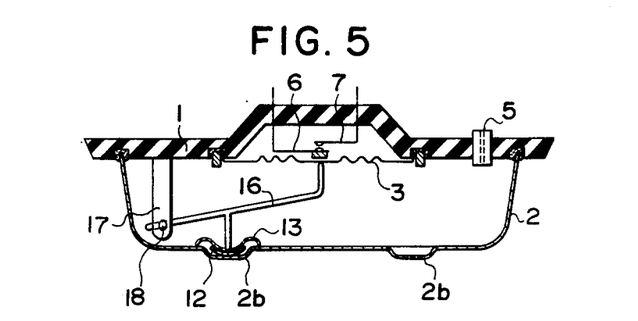
FIG. 5 is a cross sectional view showing a construction of the sensing device in which a lever is used as the operation or push rod.
Figure 6:
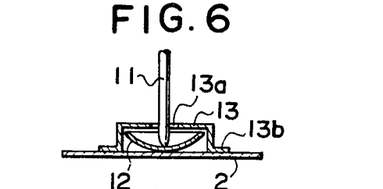
FIG. 6 is a cross sectional view in part of an example of a construction in which the circular bimetal with a curvature is fitted to the internal surface of the bottom wall of the heat-receiving section.

The part enclosing the reverse bimetal 12 may not necessarily be at the center of the heat-receiving plate 2 but may be located at a side as shown in FIG. 5. In this case, a plurality of recesses 2b may be arrayed on the heat-receiving plate 2 maintaining an equal distance on the periphery, so that one of them contains the reversible bimetal 12 and others contain nothing. A lever 16 and a support column 17 may be provided to link the contacts 6, 7 that are provided at the center diaphragm 3 and reversible bimetal 12 provided at the periphery. In this case, also, the bimetal 12 reverses at a predetermined temperature and causes the lever 16 to be pushed up via covering 13, so that the tip thereof is turned counterclockwise with the axis 18 as a center and pushes up the diaphragm 3, thereby rendering the contacts 6 and 7 to be closed. This system provides a merit that the displacement quantity of the bimetal can be increased. The aforesaid embodiments shown in FIGS. 3–5 are effective in designing the devices. Further, as shown in FIG. 6, the reversible bimetal 12 can be contained by means of the covering 13.

Figure 7:
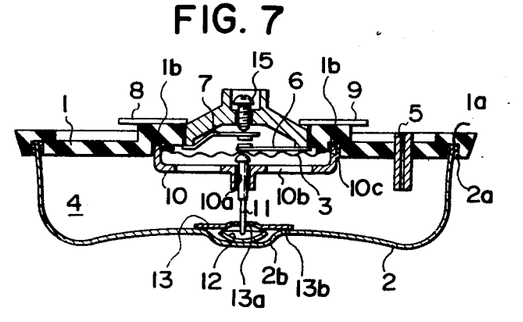
FIG. 7 is a cross sectional view showing another construction of the present sensing device.

The sensing device shown in FIG. 7 has a bowl-shaped heat-receiving plate 1 of which bottom wall being inclined. Many fire sensing devices may not produce an alarm output for extended periods of time, probably more than 10 years. Therefore, to keep reliability, it is particularly important that the major part of the sensing device undergoes less change with passage of time. The sensing device mounted on the wall surface of a builiding having thermal capacity far greater than the space of sensing region may hold moisture-containing air inside the sensing device itself. Accordingly, the structure of the sensing device have to be more ideal in order that the moisture which will change the characteristics of the constant-temperature sensing element does not contact to the bimetal for the purpose of keeping periods of time. The inclination given to the bottom wall prevents the water droplets from flowing down toward the bimetal and plays an important role in keeping operation performance for extended periods of time.

Figure 8A:
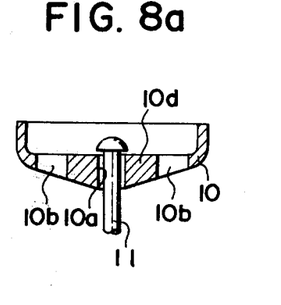
FIG. 8a is a cross sectional view showing a support mechanism of the operation rod which cooperates with the circular bimetal.
Figure 8B:
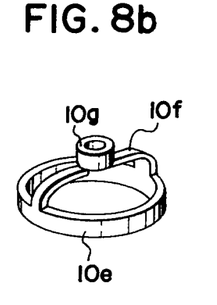
FIG. 8b is a perspective view in part showing another example of the support mechanism.
Figure 8C:
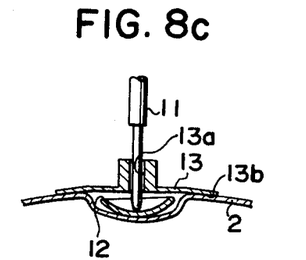
FIG. 8c is a perspective view in part showing an embodiment in which the circular bimetal is adapted to a cross section formed on the bottom wall of the heat-receiving section.

FIGS. 8a–8c show modification of guide 10 of the operation member 11. FIG. 8a shows the case in which the support part 10d is made thick to provide an axial length of loose hole 10a in which will be inserted the operation member 11. FIG. 8b shows a guide constituted by ring-like part 10e, bridge part 10f and a support 10g provided at the center of the bridge part.

FIG. 8c shows the guide case in which the function is effected by the cover 13 of the reversible bimetal 13. The surrounding of the central hole 13a of the cover 13 is made thick to function as a bearing to thereby guide the pin 11.

Figure 9A:
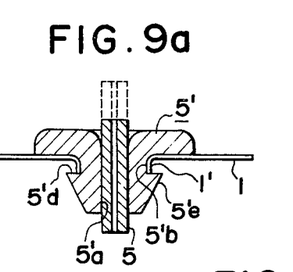
FIG. 9a is a cross sectional view in part showing an example of a leak resisting or venting means for leakage of a state changeable substance from a diaphragm space when the state changeable substance varies with a change ratio lower than a predetermined change ratio.

FIG. 9a shows a leak resistor means in which the differential sensing element sets the condition of sensing operation. When the air undergoes the change in state at a rate smaller than the determined changing rate, the leak resistor does not work and the air is leaked thereby avoiding actuation by the diaphragm.

The aforesaid leak resistor features the construction in that there is no need of an internal thread on the member 1 or the main body 3 to attach the leak resistor to the member 1, and the attachment is very easy; leak resistance can be adjusted simply by the increase or decrease of the axial length. The hole of an appropriate size may be punched on the mounting frame 1 which is supporting the diaphragm, and the cross section may be so formed as to establish a hook 1'. The resilient member 5' has a narrow end for easy insertion in the hole of the frame 1 and also has a fitting hole 5'b, so that the cross section of the hole of the mounting frame 1 undergoes airtight fitting to the engaging part I' of a hook shape. Also, the retaining part 5'd prevents the resilient member 5' from being easily detached from the hole of the mounting frame 1 due to vibration, etc. The leak resistor 5 may be a glass resistor of an appropriate length and having a fine hole. The aforesaid leak resistor can be assembled simply by pushing the resilient member 5' into the hole of the mounting frame 1 until the engaging part 1' is engaged, and then inserting the leak resistor 5 to the central hole 5'a of said resilient member 5'. Therefore, the assembling operation is very efficient. The shape of said fitting hole 5'b or the hook 1' needs not be specified, but may be so formed that the resilient member 5' is fitted air-tightly to the mounting frame 1 and does not easily detach therefrom.

Figure 9B:
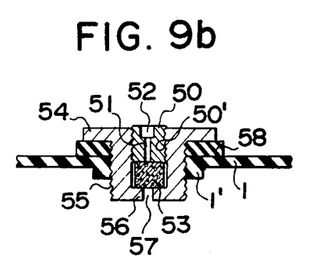
FIG. 9b is a cross sectional view in part showing an example of a conventional leak resisting means.

FIG. 9 shows a conventional leak resistor, in which there is used an auxiliary member composed of a female screw 1' attached by wax to the support plate 1. The reference number 58 stands for a resilient rubber such as of neoprene rubber, enabling the main body 54 to be screwed into the frame 1. The number 50 is a plug having at its center small holes 51 and 52 that admit flow of air and screwed to the threaded groove 50' engraved on the inside of the main body 54. The number 53 stands for a cotton made of nylon and adjusts the amount of air leakage being compressed by the plug 50 and the bottom part 56 of the main body 54. That is, part of the air expanded in the air chamber leaks toward outside through the small hole 57 provided below the main body 54 through the clearance of cotton 53 and through the small holes 51 and 52 of the plug 50. But according to such a construction, it was very troublesome to keep the resistance to the air constant by screwing the plug 50 to compress the cotton 53.

Figure 10:
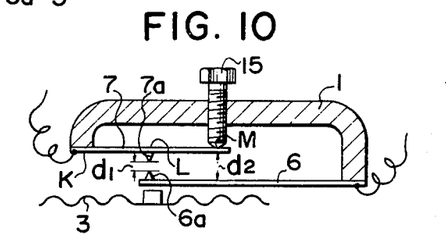
FIG. 10 is a cross sectional view in part showing an electric contact gap adjusting means for effectively utilizing the sensitivity matching principle of this invention for the purpose of the sensitivity adjustment.

FIG. 10 shows the construction of an electric contact which makes easy and accurate the sensitivity adjustment when the industrially manufactured devices are being applied to wide sensing ranges. The distance between contacts 6a and 7a is set to $d_1$ and the distance between the support pieces 6 and 7 at a position to which will come into contact the adjustment screw 8 is set to $d_2$. The fixed end of the support piece 7 serves as a support point K and the position of attaching the contact 7a is represented by L, and the position at which the tip of the adjustment screw 15 comes into contact with the support piece is shown by M. To effect fine adjustment of sensitivity, it is better to make small the change of distance $d_1$ between contacts than to change the distance $d_2$ between support pieces 6 and 7. To do this, the distance KL from the support point K to the position of contact 7a is made smaller than the distance KM from the support point K to the position M to which comes into contact the adjustment screw 15, as shown. At this time, there holds a relation $\Delta d_1/\Delta d_2 = <1$, enabling easy fine adjustment of the operation point.

According to the embodiment of FIG. 10, the diaphragm 3 is so constructed as to press the contact support piece 6 just below the contact attaching position 6a, and therefore, the displacement amount of the diaphragm 3 is equal to the displacement amount of the contact 6a. When, where said contact 6a is attached below the adjustment screw 15, the diaphragm 3 pushes the middle of the contact support piece 6, i.e., middle part between the contact attaching end and the fixed end, so that the displacement amount by the contact 6a is greater than the displacement amount by the diaphragm 3. As a result, even a small displacement of the diaphragm 3 causes the contacts 6a and 7a to close, but a large force is required to press and deflect the contact support piece 6. The embodiment of FIG. 10 has quite a contrary character, and accordingly, they can be chosen according to the requirements.

Figure 13:
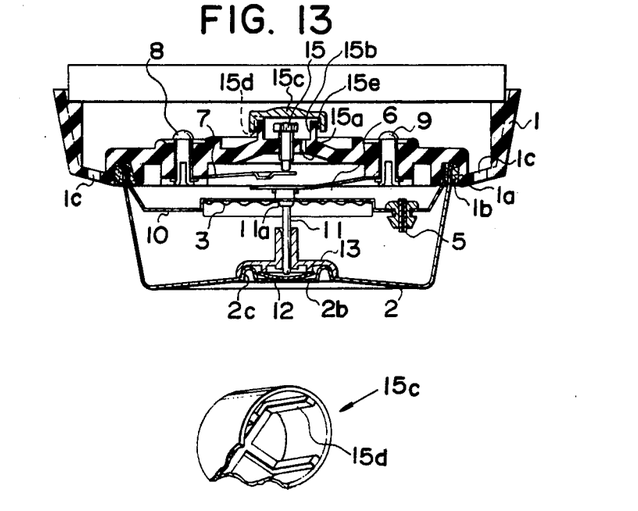

FIG. 13 shows another embodiment of the composite heat-system fire sensing device which is suited for mass production and which allows more appropriate sensitivity matching. This embodiment incorporates many means for keeping reliability for extended periods of time. The surrounding of the adjustment screw 15 is provided with an annular part 15b which is studded from the support frame; and a hole 15a is punched on the bottom wall. The hole 15a varies with the temperature of the air above diaphragm 3 which also varies with the atmospheric temperature, to maintain unchanged diaphragm characteristics. A cap 15c is covered on the annular part 15b and a crossshaped projection 15d is provided inside thereof. That is, a clearance equal to the projection 15d is maintained between the cap 15c and the annular part 15b, so as to prevent change of atmosphere. In addition, even when moisture or water drops are formed on the ceiling or on the surface of the mounting member of the sensing device, the design has been so made that such water droplets will not enter to the sensing device through the adjustment screw 15 or through the hole 15a. Likewise, a hole 1c is provided at the outermost inner edge of the base plate 1, and the peripheral surface forming the hole 1c is inclined by about 15° so that the water droplets agglomerated will be dropped outside of the base plate 1, thereby eliminating a cause that may deteriorate the reliability. An inclination such that the outer periphery is lower than the center is given to the bottom wall 2 of the heatreceiving part, and a part that will be occupied by the reversible bimetal is formed by the annular protrusion 2c in order that the heat mass is not increased. The covering 13 having a guide of pin 11 is covered thereon, so that the bimetal is protected from the intrusion of moisture. In this way, more increased reliability can be exhibited, providing excellent sensitivity matching.

What is claimed is:

1. A composite heat-system fire sensing device including differential and constant temperature sensing elements comprising in combination:

an open-mouthed generally bowl-shaped heat-receiving member having a bottom wall;

a diaphragm positioned across the open mouth of said heat-receiving member and forming a heat-receiving chamber therewith, venting means being provided for venting said chamber to the atmosphere;

a reversible bimetallic element positioned within said chamber adjacent the bottom wall thereof and adapted to reverse shape at a predetermined temperature from a normally concave configuration to a convex configuration;

a pair of electrical contact members mounted in predetermined adjustably spaced relation on one side of said diaphragm remote from said reversible bimetallic element and adapted to be connected to an electrical circuit of an alarm device;

a push rod member mounted within said chamber having one end thereof adjacent said reversible bimetallic element in the normally concave configuration thereof, said push rod member being shiftable by said reversible bimetal element upon reversal of the shape thereof so as to engage with one side of said diaphragm to displace said diaphragm a distance sufficient to engage with one of said electrical contact members to thereby urge said one electrical contact member into engagement with the other of said electrical contact members;

a gaseous medium being provided within said chamber adapted, upon expansion thereof due to a rise in temperature in excess of a predetermined rate, to displace said diaphragm a distance sufficient to engage with said one of said electrical contact members to thereby urge said one electrical contact member into engagement with the other of said electrical contact members;

said reversible bimetallic element being so dimensioned that the maximum displacement distant thereof from the concave to the convex configurations is greater than the displacement distance of said diaphragm during a predetermined standard period of time;

and means for adjusting the spacing between said electrical contact members to thereby regulate the sensitivity of the device.

2. A composite heat-system fire sensing device according to claim 1, wherein a base plate made of an insulative material is provided and said heat-receiving member is secured to said base plate to depend therefrom, at least a portion of said heat-receiving member being spaced from said base plate and said diaphragm being interposed between said base plate and heat-receiving member within the spacing therebetween, said electrical contact members being carried respectively on respective upper and lower support pieces, said support pieces being mounted on said heat receiving member, and said space adjusting means comprising a screw threadedly carried by said base plate in overlying relation and engageable with the said upper support pieces.

3. A composition heat-system fire sensing device according to claim 1, wherein a recess is formed in the bottom wall of said heat-receiving member dimensioned and configured to accommodate said reversible bimetallic element therein.

4. A composite heat-system fire sensing device according to claim 1, wherein said recess is formed in the central portion of said bottom wall.

5. A composite heat-system fire sensing device according to claim 1, wherein said recess is formed at a location of said bottom wall offset from the central portion thereof, a support column being provided within said heatreceiving chamber, a lever pivotably fulcrummed adjacent one end thereof in said support column and having the other end thereof offset upwardly so as to engage said diaphragm upon upward pivotal movement of said other end thereof, said push rod member depending from an intermediate location of said lever such that the lower extremity thereof is engageable by said reversible bimetallic element.

6. A composite heat-system fire sensing device according to claim 1, wherein said bottom wall of said heat-receiving member is inclined downwardly away from the central portion thereof to thereby provide for drainage of condensate away from the said bimetallic element.

7. A composite heat-system fire sensing device according to claim 1, wherein a push rod guide plate is provided within said chamber, an aperture being formed in said guide plate dimensioned to slidably receive said push rod therein and to guide same as said push rod is shifted by said bimetallic element into engagement with said diaphragm.

8. A composite heat-system fire sensing device according to claim 1, wherein a base plate made of an insulative material is provided and said heat-receiving plate is secured to and depends from said base plate, said space adjustment means comprises an adjustment screw threadedly carried by said base plate, said base plate having an annular upstanding collar surrounding said adjustment screw, an aperture being formed in said base plate within said annular collar, a cap member being carried by said annular collar having a depending projection adapted to maintain a clearance between segments of said cap and collar, whereby the upper surface of said diaphragm is vented to the atmosphere.

* * * * *